United States Patent [19]
Lester et al.

[11] Patent Number: 6,036,255
[45] Date of Patent: Mar. 14, 2000

[54] MULTI-FUNCTIONAL VEHICLE DOOR SYSTEM HAVING A COMMON DOOR LOWER

[75] Inventors: Paul Lester, South Lyon; Mark Deadrick, Beveraly Hills; Randolph C. Smith, Livonia, all of Mich.

[73] Assignee: Chrysler Corporation, Auburn Hills, Mich.

[21] Appl. No.: 09/148,588

[22] Filed: Sep. 4, 1998

[51] Int. Cl.[7] ....................................................... B60J 1/08
[52] U.S. Cl. ................................... 296/146.1; 296/146.2; 296/146.5; 49/502
[58] Field of Search ................................ 296/146.1, 147, 296/148, 146.2, 146.5; 49/502, 463

[56] References Cited

U.S. PATENT DOCUMENTS

| | | | |
|---|---|---|---|
| 4,328,642 | 5/1982 | Presto | 49/502 |
| 4,644,699 | 2/1987 | Chandler et al. | 296/148 |
| 4,785,585 | 11/1988 | Grier et al. | 49/502 |
| 5,001,867 | 3/1991 | Dupuy | 49/502 |
| 5,033,236 | 7/1991 | Szerdahelyi et al. | 49/502 |
| 5,067,281 | 11/1991 | Dupuy | 49/502 |
| 5,308,138 | 5/1994 | Hlavaty | 49/502 |
| 5,379,553 | 1/1995 | Kimura et al. | 49/502 |
| 5,647,171 | 7/1997 | Wirsing et al. | 49/502 |
| 5,829,195 | 11/1998 | Ojanen | 296/148 |
| 5,857,732 | 1/1999 | Ritchie | 296/146.2 |
| 5,867,942 | 2/1999 | Kowalski | 49/502 |
| 5,907,897 | 6/1999 | Hisano | 49/502 |
| 5,927,021 | 7/1999 | Kowalski et al. | 49/502 |

*Primary Examiner*—Joseph D. Pape
*Assistant Examiner*—Kiran Patel
*Attorney, Agent, or Firm*—James R. Yee

[57] ABSTRACT

A multi-functional vehicle door system includes a common lower door adapted to selectively cooperate with one of a door cassette and a side curtain assembly. The common lower door defines a cavity which opens adjacent an upper surface of the common lower door. The door cassette includes a frame defining a window opening and a lower portion adapted to be substantially inserted into the cavity of the common lower door. The side curtain assembly includes a frame and a flexible window. The frame includes a plurality of downwardly extending locating pins. One of the locating pins is adapted to engage an aperture provided in the upper surface of the common lower door. The other locating pins are adapted to engage apertures provided in a trim plug removably insertable into the opening of the common lower door.

19 Claims, 2 Drawing Sheets

MULTI-FUNCTIONAL VEHICLE DOOR SYSTEM HAVING A COMMON DOOR LOWER

BACKGROUND OF THE INVENTION

1. Technical Field

The present invention generally relates to a vehicle door system. More particularly, the present invention relates to a multi-functional vehicle door system having a common door lower.

2. Discussion

Doors for motor vehicles are often made as unitary structures for enclosing the entire door opening of a motor vehicle body. The lower housing portion of the door structure typically carries a window regulating mechanism which displaces a window panel between a raised position at which the window panel covers the upper portion of the door opening, and a retracted position in which the window panel is recessed within a cavity in the lower housing portion. The lower housing portion is generally formed from an outer panel and an inner panel which define the cavity therebetween adapted to receive the window panel. The lower housing structure also includes door closure actuating means such as a latch mechanism and means for hingedly securing the door within the door opening of the vehicle body.

It has also been known to construct a vehicle door from separate upper and lower portions. In particular, early car models often included a door panel hingedly secured to the vehicle body which covered only a lower portion of the side opening of a vehicle. The top of the side opening was then covered by a separate panel or other window housing separately secured to the vehicle body. In addition, it has been known to hingedly or slidably secure the upper panel or housing to the lower door structure, but such constructions have typically permitted only limited displacement of the upper panel. For example, some previously known upper panels merely overlap the lower door structure or an adjacent body panel of the vehicle, and can obstruct areas within the vehicle passenger compartment.

Commonly owned U.S. Pat. No. 4,716,682 to DeRees discloses a modular door having a lower door housing defining a cavity adapted to receive a glass panel, and an upper cassette including a housing carrying a track for displaceably mounting the glass panel with respect to the upper housing and a regulator for controlling displacement of the glass panel along the track. The cassette is removable attached as a unit to the lower door housing to selectively expose the passenger compartment through a large portion of the door opening in the vehicle body. The lower housing is hingedly secured to the vehicle body within the door opening and wholly supports the upper housing of the cassette. The door unit seals against a weather seal extending around the periphery of the door opening when the glass panel is displaced to its fully extended position. U.S. Pat. No. 4,716,682 is incorporated by reference as if fully set forth herein.

While known door systems, including but not limited to the type shown in U.S. Pat. No. 4,716,682 provide certain advantages, they are all subject to improvement.

SUMMARY OF THE INVENTION

It is a general object of the present invention to provide an improved door system for a motor vehicle.

It is another object of the present invention to provide a multi-functional vehicle door system having a common door lower.

In one form, the present invention provides a door system for a motor vehicle. The door system includes a lower door member and an upper door cassette. The lower door member defines a cavity. The cavity opens adjacent an upper edge of the lower door member. The upper door cassette has an insert portion shaped to be received by the cavity through the opening when the door system is operated in a first mode. The insert portion extends substantially within the cavity.

In another form, the present invention provides a multi-functional door system for a motor vehicle. The multi-functional door system includes an upper door cassette, a side curtain assembly and a common lower door member. The upper door cassette includes a frame defining a window opening and a rigid glass panel movable between an open position and a closed position within the window opening. The side curtain assembly includes a frame for supporting a flexible window panel. The common lower door member is adapted to selectively cooperate with the side curtain and the upper door cassette.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
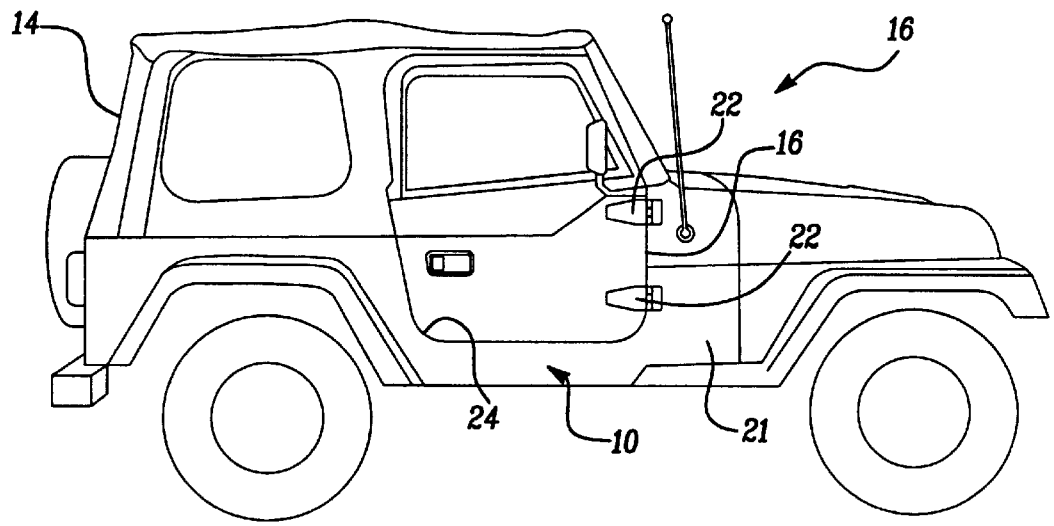
FIG. 1 is a side view of an exemplary motor vehicle incorporating a door system constructed in accordance with the teachings of a preferred embodiment of the present invention.

With initial reference to FIG. 1, a door system for motor vehicle is illustrated and generally identified with reference numeral 10. The door system 10 is shown operatively associated with an exemplary motor vehicle 12. The exemplary motor vehicle illustrated is of the type sold by the assignee of this application under its registered trademark "JEEP". In the environmental view of FIG. 1, the motor vehicle 12 is illustrated to include a soft top operatively associated with the door system 10. It will be understood that the door system 10 of the present invention is also adapted to cooperate with a hard top (not shown). One suitable top system incorporating a hard top and a soft top is shown and described in commonly assigned U.S. Ser. No. 60/028,998, which is hereby incorporated by reference as if fully set forth herein.

Figure 2:
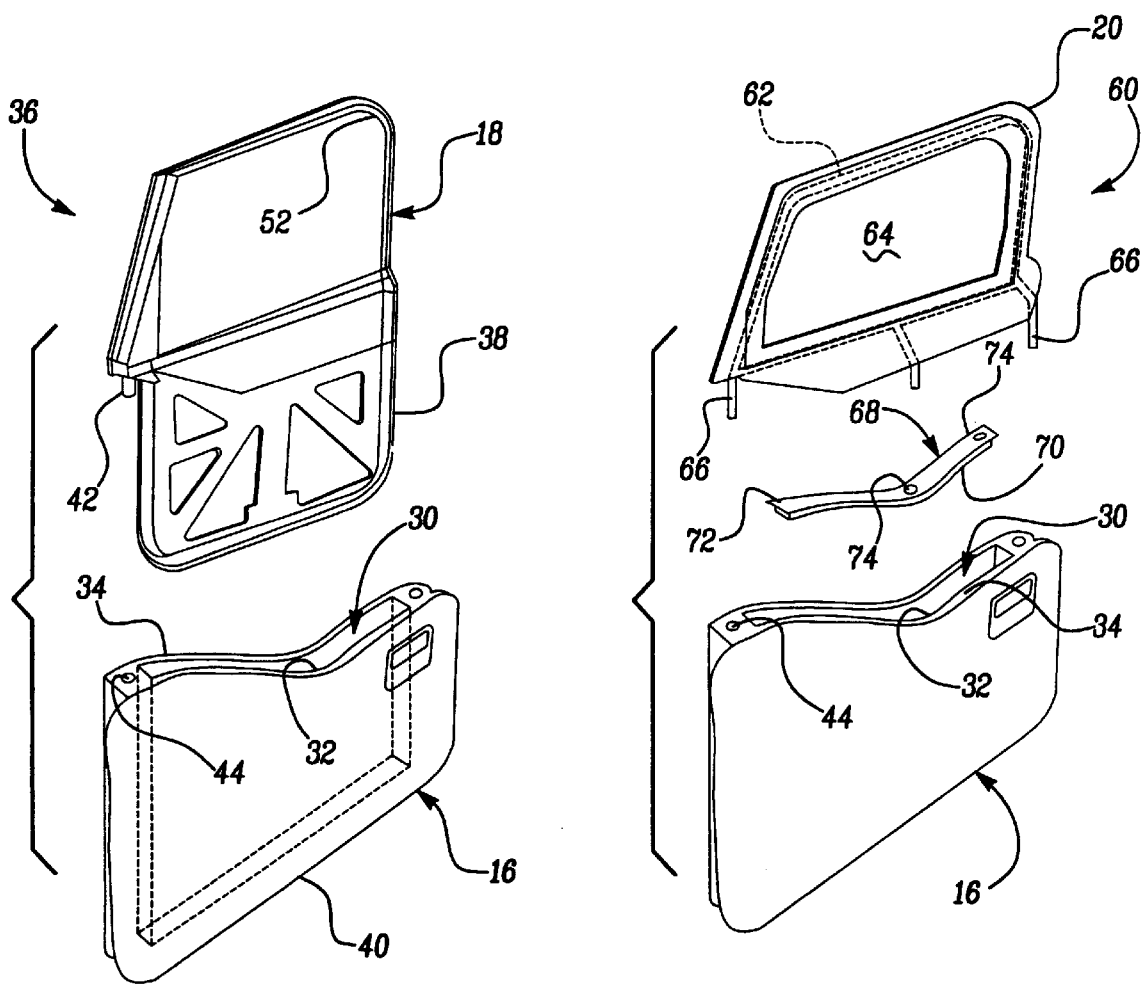
FIG. 2 is an exploded perspective view of a first door assembly of the vehicle door system of the present invention.
Figure 3:
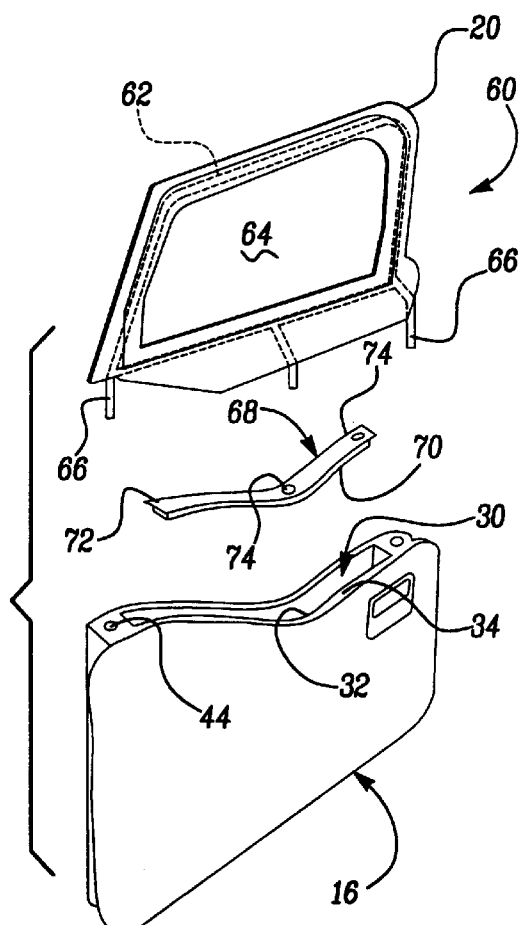
FIG. 3 is an exploded perspective view of a second door assembly of the vehicle door system of the present invention.

With continued reference to FIG. 1 and additional reference to the partially exploded views of FIGS. 2 and 3, the vehicle door system 10 of the present invention is shown to generally include a common lower door portion or lower door member 16, a door cassette 18 and a side curtain assembly 20. As will become apparent below, the common lower door portion 16 is adapted to selectively cooperate with the door cassette 18 when the door system 10 is used in a first mode and the side curtain assembly 20 when the door system 10 is used in a second mode. Alternatively, the door system 10 can be used in a third mode in which neither the door cassette 18 nor the side curtain assembly 20 is employed.

As shown in FIG. 1, the lower door portion 16 is adapted to be pivotally attached to the body 21 of the vehicle 12 through a pair of conventional hinges 22. The hinges 22 conventionally allow the lower door portion 16 to pivot between an open position and a closed position to selectively provide access through a door opening 24. The lower door portion 16 has a peripheral outline which substantially corresponds to a lower portion of the door opening 24 along the sides and bottom of the door opening 24.

Figure 5:
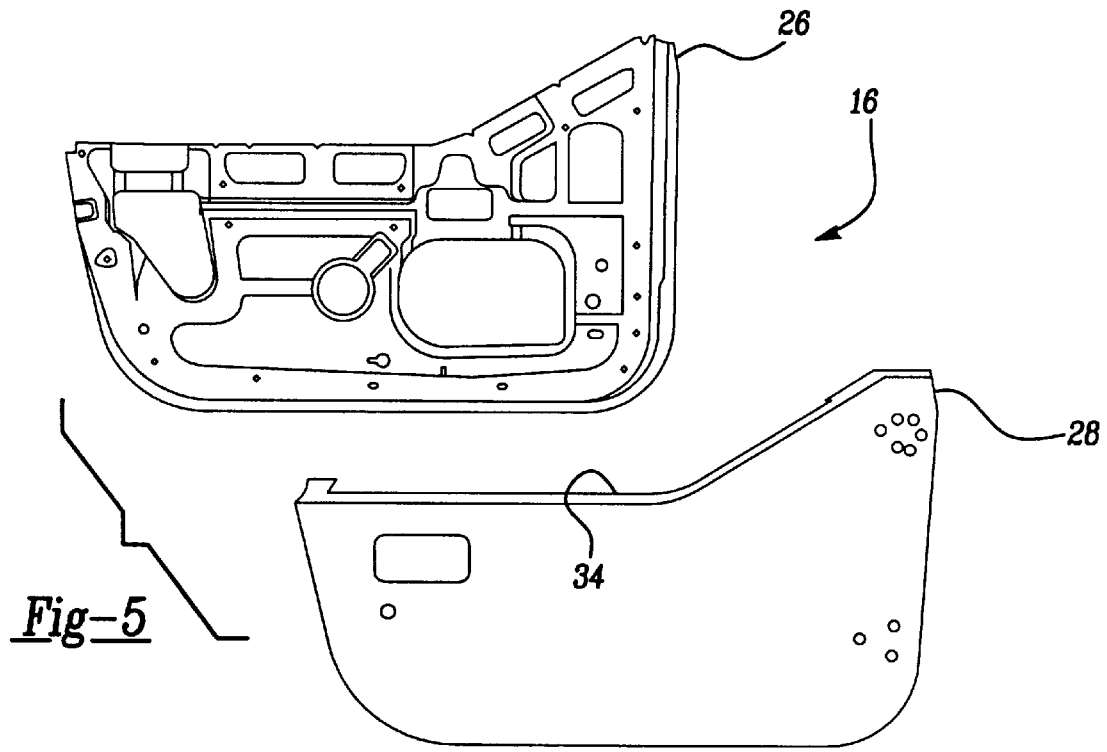
FIG. 5 is an exploded view of the common lower door of FIG. 1.

With additional reference to FIG. 5, the common lower door portion 16 is preferably illustrated to include an inner panel 26 and an outer panel 28. The inner and outer panels 26 and 28, in one application, are stamped from steel and welded or otherwise securely attached to one another. The inner and outer panels 26 and 28 cooperate to define a cavity 30 (identified in FIG. 2). The cavity 30 is accessible through an opening 32 provided in an upper surface 34 of the common lower door portion 16.

With specific reference to FIG. 2, the common lower door portion 16 selectively cooperates with the door cassette 18 to provide a first door assembly 36. In this regard, the door cassette 18 includes a lower portion or insert portion 38 shaped to be received by the cavity 30 through the opening 32 when the door system 10 of the present invention is to be operated in first mode. The insert portion 38 downwardly extends into the cavity 30 proximate to a lower edge 40 of the common lower door portion 16. For further stability, the door cassette 18 includes a downwardly extending locating member or pin 42 adapted to engage an aperture 44 provided in the upper surface 34 of the common lower door portion 16.

Figure 4:
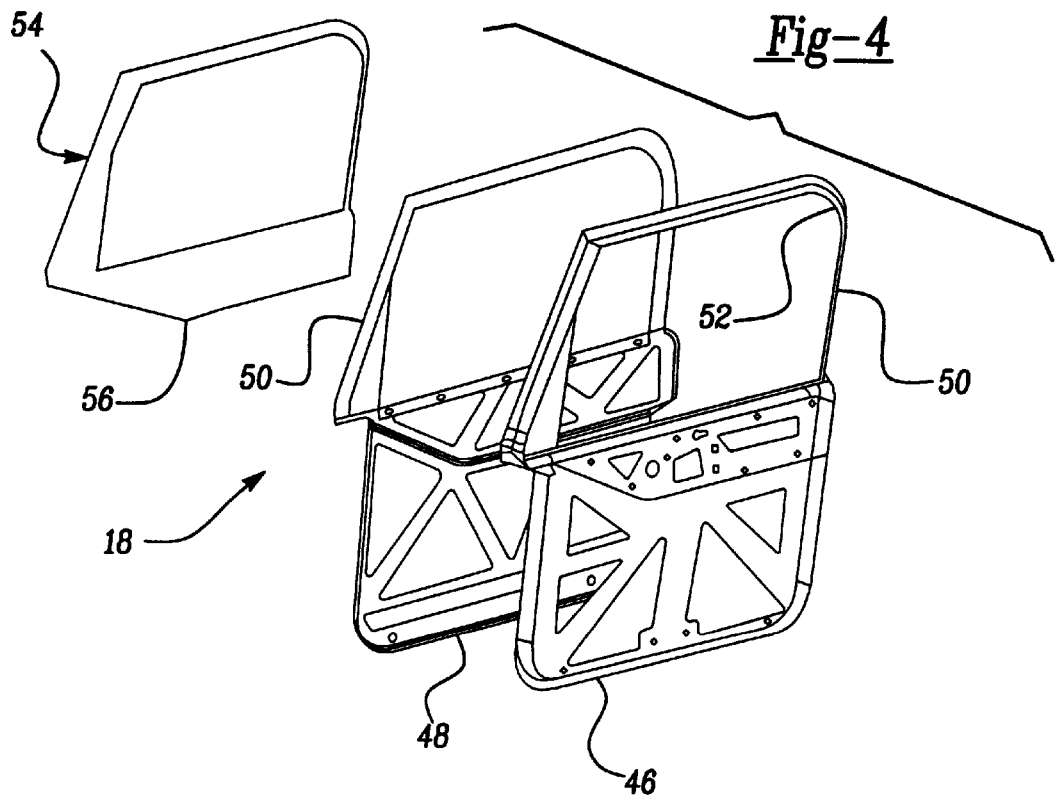
FIG. 4 is an exploded view of the door cassette of FIG. 2.

With additional reference to the exploded view of FIG. 4, the door cassette 18 is shown to preferably include inner and outer members 46 and 48 which are welded to one another. The inner and outer members 46 and 48 each include an upper frame 50. The upper frame 50 of the inner and outer members 46 and 48 cooperate to define a window opening 52. The door cassette 18 is further shown to include an exterior upper portion 54 adapted to bolt or otherwise suitably attached to the inner and outer members 46 and 48 during final assembly. The exterior portion 54 includes a lower surface 56 adapted to cooperate with the upper surface 34 of the common lower door portion 16. Alternatively, it will be appreciated by those skilled in the art that the door cassette 18 may be unitarily constructed from a composite material.

While not specifically shown, it will be understood that the door cassette 18 is adapted to receive a rigid glass panel linearly translatable between a first position in which the glass panel is located within the window opening 52 and a second position in which the glass panel is located within the cavity 30 of the common lower door portion 16. It will further be understood that a conventional handle assembly and window regulator may be carried by the lower portion 38 of the door cassette 18.

With specific reference to FIG. 3, the side curtain assembly 20 is shown to cooperate with the common lower door portion 16 to form a second door assembly 60 for use when the door system is used in the second mode. The side curtain assembly 20 is illustrated to include a frame 62 (shown largely in broken lines) which defines a window opening and a flexible window 64 carried by the frame 62. The flexible window 64 may be attached to the frame 62 in any suitable manner.

The frame 62 is shown to include a plurality of downwardly extending locating members or locating pins 66. In the embodiment illustrated, the frame 62 includes three downwardly extending locating members 66. However, it will be appreciated by those skilled in the art that the particular number employed is subject to modification depending on particular applications. A first of the downwardly extending locating members is adapted to engage the aperture 44 provided in the upper surface of the common lower door portion 16.

To receive the remaining downwardly extending locating pins 66, the upper surface 34 of the second door assembly 60 of the door system 10 of the present invention is shown to further include a trim member or trim plug 68. The trim plug 68 includes a base portion 70 adapted to be inserted into the opening 32 leading to the cavity 30 of the common lower door portion 16. The trim member 68 further includes an upper flange 72 adapted to cooperate with the upper surface 34 remainder of the common lower door portion 16. When the base portion 70 is inserted into the opening 32, the trim member 68 substantially closes the opening 32. The trim member 68 is formed to include a pair of apertures 74 extending vertically therethrough which are adapted to receive a pair of the downwardly extending locating members 66. The trim member 68 may also be used to close the opening 32 when the common lower door portion 16 is used without either of the door cassette 18 or side curtain assembly 20.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

We claim:

1. A door system for a motor vehicle, the door system comprising:

a lower door member defining a cavity, said cavity open adjacent an upper edge of said lower door member;

an upper door cassette having an insert portion shaped to be received by said cavity through said opening when the door system is operated in a first mode, said insert portion extending substantially within said cavity; and a side curtain assembly including a frame for supporting a flexible window panel, said side curtain assembly adapted to removably mount to said lower door member when said door system is operated in a second mode.

2. The door system for a motor vehicle of claim 1, wherein said upper door cassette includes a frame defining a window opening.

3. The door system for a motor vehicle of claim 1, wherein said upper surface of said lower door member defines a plurality of apertures and further wherein said side curtain assembly includes a corresponding plurality of locating pins adapted to be inserted into said apertures.

4. The door system for a motor vehicle of claim 3, wherein said upper surface of said lower door member includes a removable trim plug for covering said opening when said common lower door member is selectively used with said side curtain assembly.

5. The door system for a motor vehicle of claim 4, wherein at least one of said plurality of apertures is provided in said trim plug.

6. A multi-functional door system for a motor vehicle, the multi-functional door system comprising:

an upper door cassette including a frame defining a window opening;

a side curtain assembly including a frame for supporting a flexible window panel; and a common lower door member adapted to selectively cooperate with said side curtain assembly and said upper door cassette.

7. The multi-functional door system for a motor vehicle of claim 6, wherein said common lower door member defines a cavity and includes an upper surface having an opening to said cavity.

8. The multi-functional door system for a motor vehicle of claim 7, wherein said upper door cassette includes an insertable portion shaped to pass through said opening and extend substantially within said cavity.

9. The multi-functional door system for a motor vehicle of claim 7, wherein said upper surface of said lower common door portion defines a plurality of apertures and further wherein said side curtain assembly includes a corresponding plurality of locating pins adapted to inserted into said apertures.

10. The multi-functional door system for a motor vehicle of claim 7, wherein said upper surface of said common lower door portion includes a removable trim plug for covering said opening when said common lower door member is selectively used with said side curtain assembly.

11. The multi-functional door system for a motor vehicle of claim 10, wherein at least one of said plurality of apertures is provided in said trim plug.

12. A motor vehicle comprising:

a body; and a multi-functional door system pivotally attached to said body, said door system including a lower door portion, a cassette door defining a window opening, and a side curtain assembly having a frame defining a window opening and a flexible window carried by said frame, said multi-functional door system operable in a first mode in which said cassette door and said side curtain assembly are not associated with said lower door member, said door assembly operative in a second mode in which said side curtain assembly is operatively associated with said lower door member, and said door assembly operative in a third mode in which said cassette door is operatively associated with said lower door member.

13. The motor vehicle of claim 12, wherein said common lower door member defines a cavity and includes an upper portion having an opening to said cavity.

14. The motor vehicle of claim 13, wherein said upper door cassette includes an insertable portion shaped to pass through said opening and extend substantially within said cavity.

15. The motor vehicle of claim 14, wherein said upper surface of said lower common door portion defines a plurality of apertures and further wherein said side curtain assembly includes a corresponding plurality of locating pins adapted to inserted into said apertures.

16. The motor vehicle of claim 15, wherein said upper surface of said common lower door portion includes a removable trim plug for covering said opening when said common lower door member is selectively used with said side curtain assembly.

17. The motor vehicle of claim 16, wherein at least one of said plurality of apertures is provided in said trim plug.

18. A door system for a motor vehicle, the door system comprising:

a lower door member defining a cavity, said cavity open adjacent an upper edge of said lower door member; and an upper door cassette having an insert portion shaped to be received by said cavity through said opening when the door system is operated in a first mode, said insert portion extending substantially within said cavity, said upper door cassette including a downwardly extending locating member engaging an aperture provided in an upper surface of said lower door member.

19. The door system for a motor vehicle of claim 18, wherein said upper door cassette includes a frame defining a window opening.

* * * * *